United States Patent
Causte et al.

(10) Patent No.: US 7,399,941 B2
(45) Date of Patent: Jul. 15, 2008

(54) WELDING TOOL

(75) Inventors: Eric Yves Roger Causte, Nemours (FR); Thierry Jean Emile Flesch, Pringy (FR)

(73) Assignee: SNECMA, Paris (FR)

( * ) Notice: Subject to any disclaimer, the term of this patent is extended or adjusted under 35 U.S.C. 154(b) by 44 days.

(21) Appl. No.: 11/237,771

(22) Filed: Sep. 29, 2005

(65) Prior Publication Data
US 2006/0081562 A1    Apr. 20, 2006

(30) Foreign Application Priority Data
Oct. 19, 2004    (FR)    .................................. 04 11044

(51) Int. Cl.
*B23K 9/167*    (2006.01)
(52) U.S. Cl. .......................................... 219/75; 219/72
(58) Field of Classification Search ................... 219/72, 219/74, 75
See application file for complete search history.

(56) References Cited

U.S. PATENT DOCUMENTS

| | | | | |
|---|---|---|---|---|
| 2,902,587 A * | 9/1959 | Bernard | ........................ | 219/74 |
| 3,344,505 A * | 10/1967 | Rively et al. | ................. | 219/118 |
| 3,581,052 A * | 5/1971 | Milton | ................... | 219/130.21 |
| 4,642,445 A * | 2/1987 | Stol | ........................ | 219/121.84 |
| 5,003,150 A * | 3/1991 | Stricklen | ....................... | 219/75 |
| 7,038,161 B2 * | 5/2006 | Aubry et al. | ............ | 219/121.63 |

FOREIGN PATENT DOCUMENTS

EP    1 273 382 A1    1/2003

* cited by examiner

*Primary Examiner*—Kevin P Kerns
(74) *Attorney, Agent, or Firm*—Oblon, Spivak, McClelland, Maier & Neustadt, P.C.

(57) ABSTRACT

A welding tool for TIG arc welding, plasma welding or laser welding, including a welding head carrying a refractory electrode and surrounded by a skirt. The skirt is releasably fastened on the welding head and has a front portion which extends forwards and is shaped to surround a weld head with clearance over a predetermined length. The skirt is made by molding or thermoforming a composite material made of at least two layers of ceramic fibers which are bonded together by an elastomer that withstands high temperatures.

19 Claims, 3 Drawing Sheets

WELDING TOOL

The present invention relates to a welding tool, in particular for tungsten inert gas (TIG) arc welding or plasma welding or laser welding.

BACKGROUND OF THE INVENTION

A TIG arc welding tool or a plasma welding tool comprises a head carrying a refractory electrode, such as a rod of non-meltable tungsten, capable of generating an electric arc in association with workpieces to be assembled together so as to form a weld bead between them by melting and mixing their materials.

A laser welding tool comprises a laser generator capable of generating a high energy beam that is applied to the workpieces to form a weld bead between them by melting and mixing their materials.

Such welding tools include means for feeding an inert gas to the head of the tool, the inert gas being for projecting onto the weld bead formed by the molten materials so as to protect said materials against oxidation by the ambient atmosphere.

In order to improve the protection, welders are in the habit of forming a cap of refractory adhesive tape around the welding head in order to confine the inert gas around the weld bead that is being formed and thus improve the quality of the welding.

Such caps are fragile and need to be replaced often, their shapes are not very accurate and poorly adapted to the workpieces, and different from one cap to another, and they are relatively time-consuming to make.

OBJECTS AND SUMMARY OF THE INVENTION

A particular object of the invention is to provide a solution to those problems that is simple, inexpensive, and effective, and to improve the quality of welding, in particular when the welding is automated.

To this end, the invention provides a welding tool, in particular for TIG arc welding or plasma welding or laser welding, the tool including means for feeding an inert gas to the head of the welding tool in order to protect the weld bead against oxidation, the welding head being surrounded by a skirt of semirigid refractory material for confining the protective gas, wherein the skirt comprises a front portion shaped to surround the weld bead with clearance over a predetermined length, and means enabling it be releasably fastened to the welding head, the free edge of the skirt situated beside workpieces for welding together being shaped to match the shapes and dimensions of the junction zone of the workpieces with clearance.

The prefabricated skirt is of standard shape and dimensions determined on the basis of the shape and dimensions of the workpieces. It is easily fitted and fastened to the head of the welding tool by appropriate fastener means and presents the advantage of being interchangeable without modifying welding conditions. Furthermore, it is made of a refractory material, thereby imparting a long lifetime thereto, and thus the ability to be used in a plurality of welding operations.

The front portion of the skirt is intended to match as closely as possible the shapes of the workpieces, while nevertheless not touching them and allowing an outlet flow of gas to pass over a major fraction of its periphery at a rate that is regular so as to provide effective protection to the weld bead against oxidation.

In an embodiment of the invention, the skirt is made of a composite material based on ceramic fibers and an elastomer that withstands high temperatures.

The elastomer serves to bind together the ceramic fibers which are preferably woven, and ensures that the skirt is relatively flexible.

The skirt advantageously includes a metal sheet providing thermal protection that is integrated in the composite material between two layers of ceramic fibers.

The metal sheet forms a heat shield which increases the ability of the skirt to withstand high temperatures and enables it to conserve a given shape. The metal sheet is preferably made out of the same metal as the workpieces so as to avoid polluting the molten materials in the event of the skirt coming into contact with the weld bead.

The skirt of the invention advantageously comprises a plurality of layers of materials that withstand high temperatures and it is preferably made by molding or thermoforming, thus enabling identical skirts to be produced using a mold of shapes and dimensions that are determined on the basis of the shapes and dimensions of the workpieces, thereby providing numerous advantages:

the quality of the welds remains constant when using skirts made in succession by means of a common mold; the shape and the dimensions of the skirts can be optimized to obtain weld beads of high quality, in particular beads that are substantially rectangular, of narrow width, and of great penetration depth;

the time required to make the skirt is considerably shorter than in the prior art; and the operability of the welding tool is improved since it no longer depends on the quality with which the skirt is made.

The skirt advantageously includes a rear opening to pass a wire of filler metal and to allow the welding zone to be observed.

The rear opening does not impede confinement of the inert gas within the skirt since the welding tool is moved rearwards.

With automated welding, the welding tool is mounted on a robot arm that also carries a camera for observing the welding zone through the rear opening in the skirt.

BRIEF DESCRIPTION OF THE DRAWINGS

Other advantages and characteristics of the invention appear on reading the following description made by way of non-limiting example and with reference to the accompanying drawings, in which.

MORE DETAILED DESCRIPTION

Figure 1:
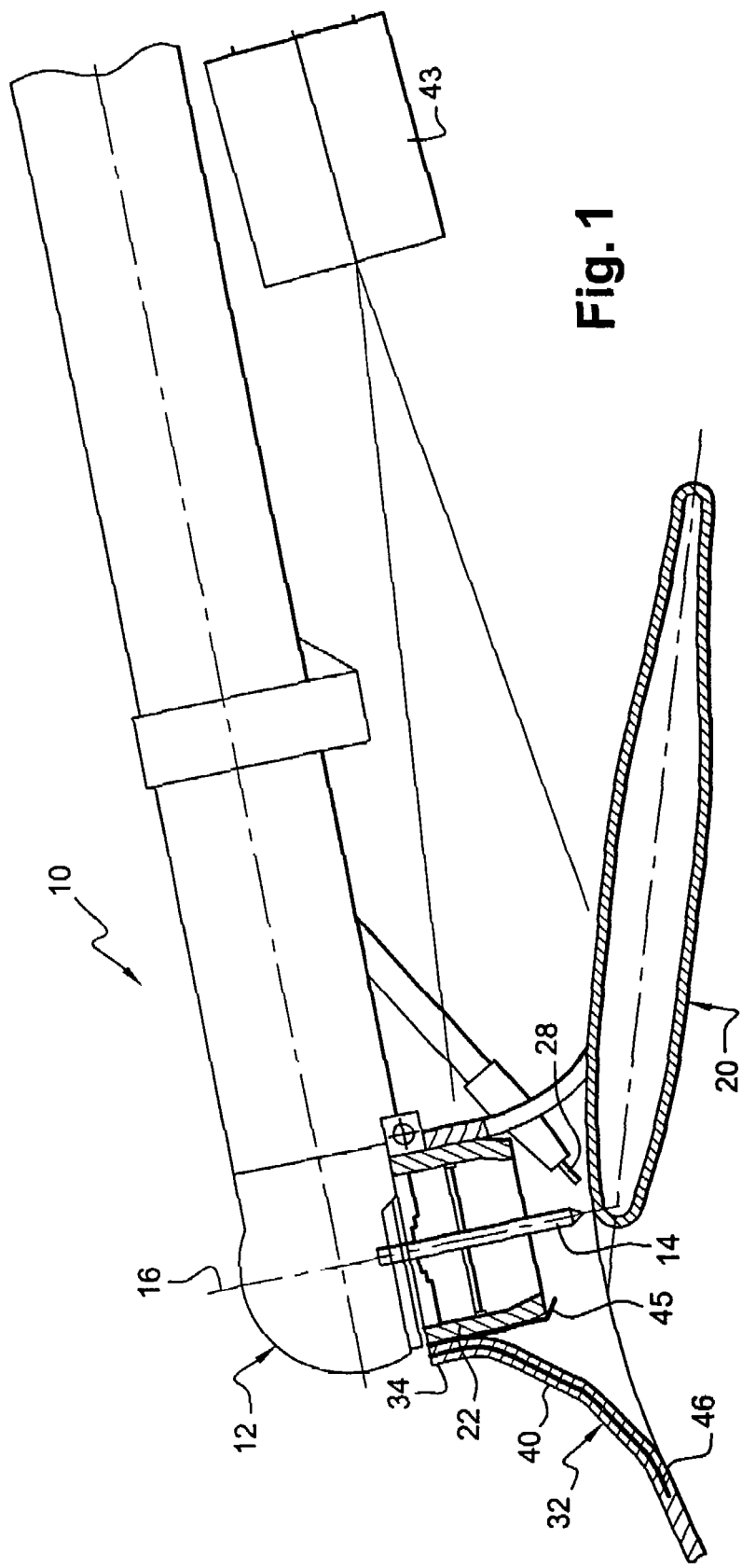
FIG. 1 is a diagrammatic longitudinal section view of a welding tool fitted with a skirt of the invention.
Figure 2:
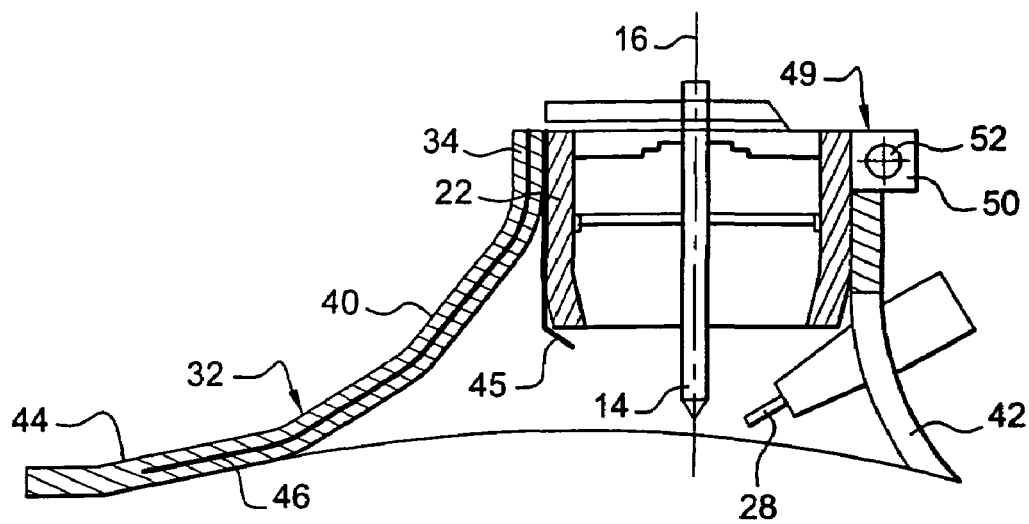
FIG. 2 is a fragmentary view of FIG. 1 on a larger scale.

FIG. 1 is a diagram showing the front portion of a TIG arc welding tool 10 or a plasma welding tool, of the type suitable for handling by means of a robot arm.

The front portion of the tool comprises a welding head 12 carrying a refractory electrode 14, such as a rod of non-meltable tungsten, of axis 16 that is substantially perpendicular to the weld bead to be made.

During a welding operation, an electric arc is generated between the refractory electrode 14 and the junction zone between workpieces 20 that are to be assembled together so as to form a metal bath in which the materials of the workpieces 20 melt and mix together so as to constitute a weld bead after cooling down.

The top portion of the electrode 14 is surrounded by a cylindrical nozzle 22 that is shorter than the electrode 14 such that the bottom end of the electrode projects axially from the nozzle 22.

The welding operation can be performed with or without filler metal. In the implementation shown in FIG. 1, a wire 28 of filler metal is fed in controlled or automatic manner by suitable means and is guided obliquely from a portion of the welding tool 10 that is situated behind the welding head 12 so as to go towards the melt bath, in the vicinity of the electrode 14.

In this type of welding, as in laser welding, the materials in the melt bath oxidize on being exposed to the ambient atmosphere. To avoid that, the welding tool includes means for feeding an inert gas to the head 12 and into the nozzle 22 so as to flow over and around the refractory electrode 14 and the melt bath. By way of example, the inert gas used can be argon, helium, or a mixture of both.

The welding tool 10 of the invention has prefabricated means for confining the inert gas around the welding head 12 and the melt bath, which means are accurately matched to the workpieces to be assembled so as to be effective in limiting their exposure to the ambient atmosphere and thus avoid or at least greatly reduce oxidation of the molten materials by the ambient atmosphere.

These means comprise a skirt 32 of semirigid refractory material formed with a top portion 34 that is substantially cylindrical for mounting on the nozzle 22, and with a bottom portion 40 of downwardly flaring shape extending from the bottom end of the cylindrical portion 34 at least as far as the bottom end of the refractory electrode 14, and preferably slightly beyond said bottom end.

The bottom portion 40 of the skirt 32 includes a rear opening 42 extending from the bottom end of said portion 40 substantially halfway up the skirt 32, the rear opening 42 being V-shaped or U-shaped, for example, with its apex halfway up the skirt 32.

This rear opening 42 serves to pass filler metal feed means and also serves to allow an operator to observe the metal bath during a welding operation by using a video camera 43 mounted on the tool behind the head 12.

The bottom portion 40 of the skirt 32 is advantageously extended forwards, away from the opening 42, this extension 44 serving to guide the inert gas over a greater length of the weld bead that has just been formed, and is curved in concave manner around the weld bead so as to form a gas outlet at the front around the weld bead.

In the embodiment shown in the figures, the bottom end of the skirt 32 is substantially concave in shape from front to rear and the bottom portion 40 of the front extension 44 is likewise concave over at least a fraction of its length.

The skirt 32 mounted on the head 12 surrounds the cylindrical nozzle 22 having a discharger 45 mounted thereon to improve triggering the electric arc.

During a welding operation, the welding tool is moved relative to the workpieces from a front position towards a rear position. By way of example, FIG. 1 shows the front initial position of the welding tool 10 relative to a workpiece 20.

During this operation, the skirt 32 is not in contact with the workpiece 20. The bottom portion 40 of the skirt 32 and its front extension 44 are at a predetermined small and substantially constant distance from the workpiece 20 and the melt bath, so that the flow rate of inert gas passing between the bottom edge of the skirt 32 and the workpiece 20 is substantially constant and provides the melt bath with good protection against oxidation.

The shape and the dimensions of the bottom edge of the skirt 32 needs to be determined accurately as a function of the shape and the dimensions of the workpieces 20.

The skirt 32 is advantageously made by molding or thermoforming a composite material made of at least one and preferably of a plurality of layers of ceramic fibers, together with an elastomer that withstands high temperatures and that serves to bond the ceramic fiber layers together and to conserve the shape of the skirt 32 as determined by the mold cavity.

In order to increase the ability of the skirt 32 to withstand high temperatures, a metal sheet 46 is integrated in the composite material between two layers of ceramic fibers. The metal sheet 46 is preferably made out of the same material as the workpieces 20 so that there is no pollution of the metal bath with a foreign material in the event of the skirt 32 making involuntary contact with the melt bath.

Typically, the metal sheet 46 is 0.2 millimeters (mm) thick and extends between two layers of ceramic fibers over all or part of the composite material of the skirt 32. In the example shown it is of substantially rectangular elongate shape and extends over a front fraction of the skirt 32 from the top portion 34 thereof.

Figure 5:
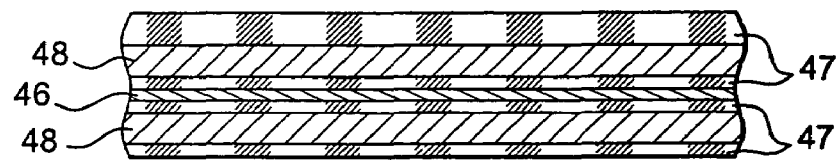
FIG. 5 is a diagrammatic section view of the skirt on a larger scale.

As shown in FIG. 5, the skirt 32 is made of a stack of layers of materials that withstand high temperatures, and comprise for example: an elastomer layer 47; a ceramic fiber layer 48; an elastomer layer 47; a metal sheet 46; an elastomer layer 47; a ceramic fiber layer 48; and an elastomer layer 47. Each fiber layer is constituted by a woven fabric of continuous fibers capable of withstanding temperatures of about 1300° C. and it remains flexible at temperatures above 1000° C., said fabric being having thickness of millimeter order.

Figure 3:
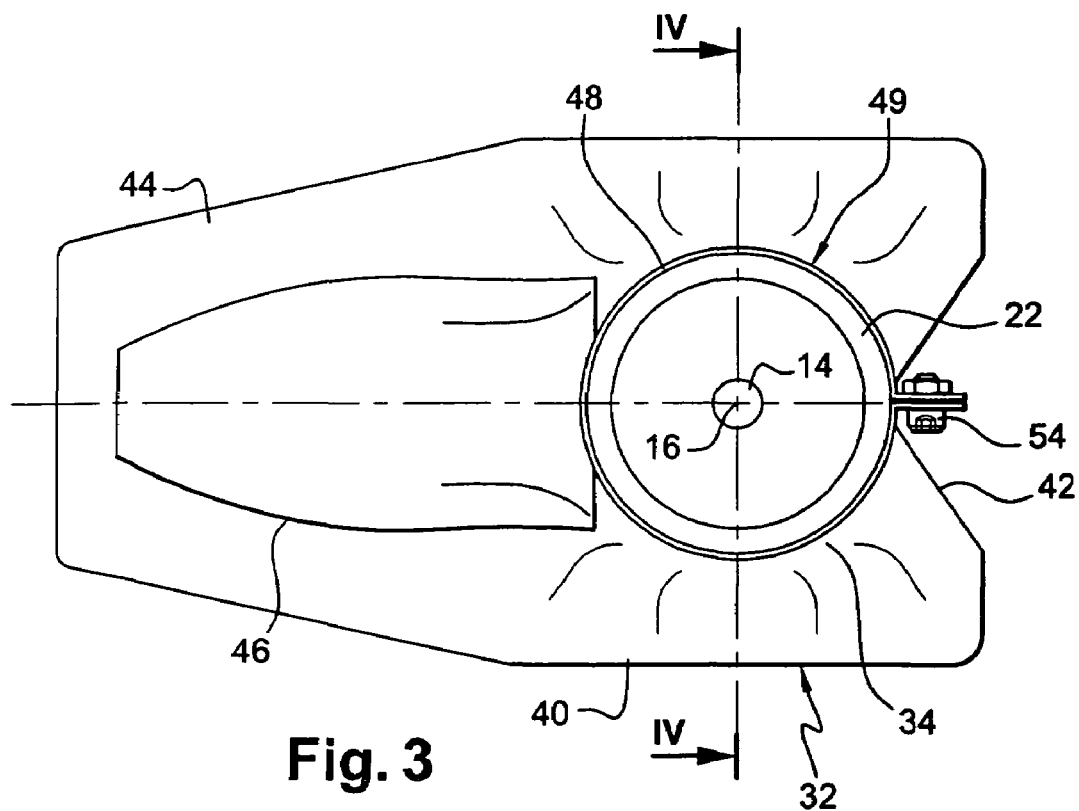
FIG. 3 is a diagrammatic plan view of the FIG. 2 skirt.
Figure 4:
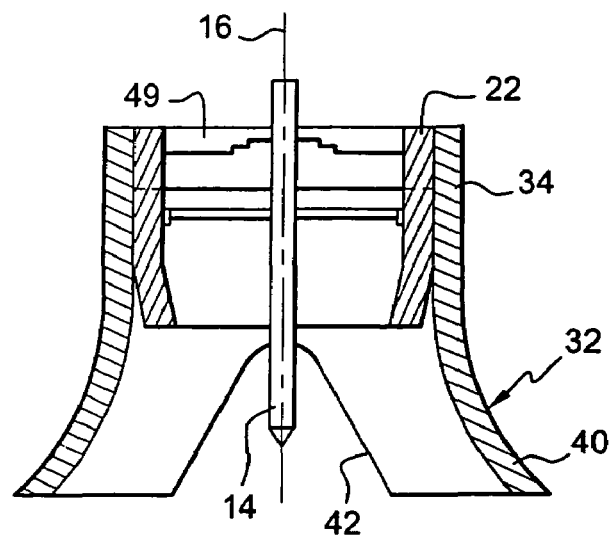
FIG. 4 is a section view on line IV-IV of FIG. 3.
Figure 6:
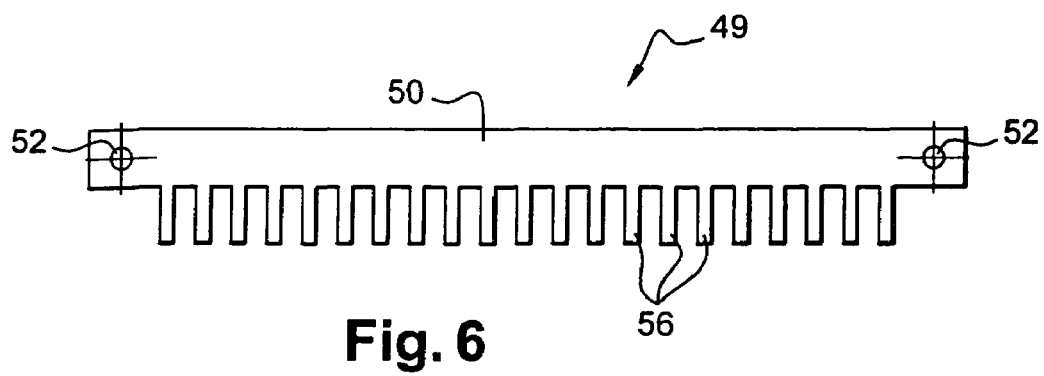
FIG. 6 is a diagrammatic view of means for fastening the skirt of the invention to the head of a welding tool.

FIG. 6 shows means 49 for fastening the skirt 32 on the nozzle 22 of the welding tool 10. These means 49 are of the clamping collar type and comprise a flexible metal strip 50 for integrating in the composite material, e.g. between two ceramic fiber layers 48 at the top end of the top portion 34 of the skirt 32 so as to match its cylindrical shape, as shown in FIG. 3. The ends of the strip 50 project from the skirt and include orifices 52 for passing fastener means 54, e.g. of the screw-and-nut type, for clamping the top portion 34 of the skirt 32 on the nozzle 22 of the welding tool 10. Typically, the metal strip 50 is 0.5 mm thick.

In the embodiment of FIG. 6, the means 49 are substantially in the form of a comb, the metal strip 50 carrying a plurality of teeth 56 on one of its sides projecting perpendicularly from the strip 50 and designed to be integrated in the composite material in order to improve anchoring of the fastener means 49.

In this embodiment of the skirt 32, the strip 50 of the fastening means 49 is inserted in the mold and shaped together with the materials that constitute the skirt 32.

In a variant, the strip 50 need not be integrated in the composite material, but can be placed on the top portion 34 of the skirt 32 around the outside thereof, and can then be clamped against the nozzle 22 of the head 12 of the welding tool 10.

Typically, for a welding tool 10 fitted with a nozzle 22 having a diameter of about 30 mm, the skirt 32 has a length of about 100 mm, a width of about 50 mm, and a height of about 40 mm. It is specifically designed to be mounted on the head of an automated welding tool of the TIG or analogous type suitable for use in a welding booth so as to ensure that weld beads are repetitively of very good quality.

What is claimed is:

1. A welding tool comprising:
   a welding head;
   a refractory electrode carried by said welding head;
   an inert gas feed positioned to feed inert gas to said welding head in order to protect a weld bead against oxidation; and
   a skirt made of a semirigid refractory material surrounding said refractory electrode;
   wherein the skirt comprises a substantially cylindrical top portion mounted on said welding head and a bottom portion of downwardly flaring shape,
   wherein said top portion of the skirt comprises a releasable fastener configured to fasten the skirt on said welding head,
   wherein said bottom portion of the skirt has an extended forward portion relative to a rear portion to guide the inert gas over a greater length of the weld bead, said forward portion being curved in a concave manner around the weld bead so as to form a gas outlet at the front around the weld bead,
   wherein said skirt includes a molded or thermoformed composite material including at least two layers of ceramic fibers which are bonded together by at least one elastomer layer that withstands high temperatures, and
   wherein said refractory electrode extends along an electrode axis, and said bottom portion of said skirt is not symmetric around said electrode axis such that said front portion of said bottom portion of said skirt extends further away from said electrode than said rear portion of said bottom portion of said skirt extends from said electrode, wherein said rear portion is opposite from said front portion.

2. A welding tool according to claim 1, wherein the skirt includes a metal sheet for providing thermal protection, said metal sheet being integrated in said composite material between the two layers of ceramic fibers.

3. A welding tool according to claim 1, wherein said bottom portion of the skirt includes a rear opening for passing a wire of filler metal and for observing a welding zone.

4. A welding tool according to claim 1, the tool being mounted on a robot arm that also carries a camera for observing a welding zone.

5. A welding tool according to claim 1, wherein said releasable fastener is integrated in the composite material of the skirt.

6. A welding tool according to claim 5, wherein the releasable fastener comprises a clamping collar.

7. A welding tool according to claim 1, wherein said refractory electrode extends along an electrode axis, and said front portion of said bottom portion of said skirt extends substantially along a bead axis perpendicular to said electrode axis and does not extend substantially along another axis perpendicular to said bead axis and to said electrode axis.

8. A welding tool according to claim 7, wherein said substantially cylindrical top portion of said skirt is mounted around said inert gas feed.

9. A welding tool according to claim 8, wherein said inert gas feed is cylindrical and surrounds at least a portion of said refractory electrode.

10. A welding tool according to claim 9, wherein said refractory electrode extends below said inert gas feed.

11. A welding tool according to claim 10, wherein said bottom portion of the skirt extends below said inert gas feed.

12. A welding tool according to claim 11, wherein said bottom portion of the skirt extends below the refractory electrode.

13. A welding tool according to claim 12, wherein said inert gas feed extends below said substantially cylindrical top portion of said skirt.

14. A welding tool according to claim 7, wherein said elastomer withstands temperatures above 1000° C.

15. A welding tool according to claim 1, wherein said front portion of said bottom portion of said skirt extends beyond a bottom end of the refractory electrode.

16. A welding tool according to claim 15, wherein said rear portion of said bottom portion of said skirt includes a rear opening extending from a bottom end of said rear portion of said bottom portion such that said rear portion, at said opening, does not extend beyond said bottom end of the refractory electrode.

17. A welding tool according to claim 16, wherein said rear portion of said bottom portion of said skirt, at said opening, is V-shaped or U-shaped.

18. A welding tool according to claim 1, wherein said front portion of said bottom portion of said skirt incorporates a metal sheet in said composite material of said skirt and said rear portion of said bottom portion of said skirt is free of said metal sheet.

19. A welding tool according to claim 1, wherein said front portion of said bottom portion of said skirt extends to a front distance away from said electrode, wherein said rear portion of said bottom portion of said skirt extends to a rear distance from said electrode, and wherein said front distance is at least twice said rear distance.

* * * * *